United States Patent
Yano et al.

(10) Patent No.: US 7,011,896 B2
(45) Date of Patent: Mar. 14, 2006

(54) PHOSPHOR THIN FILM, PREPARATION METHOD, AND EL PANEL

(75) Inventors: Yoshihiko Yano, Tokyo (JP); Tomoyuki Oike, Tokyo (JP); Masaki Takahashi, Tokyo (JP); Katsuto Nagano, Tokyo (JP)

(73) Assignee: The Westaim Corporation, Fort Saskatchewan (CA)

( * ) Notice: Subject to any disclaimer, the term of this patent is extended or adjusted under 35 U.S.C. 154(b) by 0 days.

(21) Appl. No.: 10/358,345

(22) Filed: Feb. 5, 2003

(65) Prior Publication Data
US 2003/0146691 A1  Aug. 7, 2003

(30) Foreign Application Priority Data
Feb. 6, 2002 (JP) .............................. 2002-030133
Dec. 27, 2002 (JP) .............................. 2002-381967

(51) Int. Cl.
H05B 33/00 (2006.01)
C09K 11/08 (2006.01)

(52) U.S. Cl. ..................... 428/690; 428/917; 313/503; 313/506; 313/509; 427/66; 257/102; 257/103; 252/301.6 S; 252/301.4 S

(58) Field of Classification Search ................ 428/690, 428/917; 313/503, 504, 506, 509; 427/66, 427/64; 252/301.65, 301.43; 257/102, 103
See application file for complete search history.

(56) References Cited

U.S. PATENT DOCUMENTS

| | | | |
|---|---|---|---|
| 5,309,070 A | 5/1994 | Sun et al. | |
| 5,656,888 A * | 8/1997 | Sun et al. | .................. 313/503 |
| 5,753,934 A | 5/1998 | Yano et al. | |
| 5,801,105 A | 9/1998 | Yano et al. | |
| 5,810,923 A | 9/1998 | Yano et al. | |
| 5,828,080 A | 10/1998 | Yano et al. | |
| 5,919,515 A | 7/1999 | Yano et al. | |
| 5,955,213 A | 9/1999 | Yano et al. | |
| 5,985,404 A | 11/1999 | Yano et al. | |
| 6,045,626 A | 4/2000 | Yano et al. | |
| 6,096,434 A | 8/2000 | Yano et al. | |
| 6,121,647 A | 9/2000 | Yano et al. | |
| 6,198,208 B1 | 3/2001 | Yano et al. | |
| 6,258,459 B1 | 7/2001 | Noguchi et al. | |
| 6,387,712 B1 | 5/2002 | Yano et al. | |
| 6,597,108 B1 * | 7/2003 | Yano et al. | .................. 313/503 |

(Continued)

FOREIGN PATENT DOCUMENTS

CA   2 431 084 A1   7/2002

(Continued)

OTHER PUBLICATIONS

Mitsuhiro Kawanishi, et al., "CaAl$_2$S$_4$:Ce Thin Film el Devices Prepared by the Two Targets Pulse Electron-Beam Evaporation", Technical Report of IEICE, EID 98-113, Jan. 1999, pp. 19-24.

(Continued)

*Primary Examiner*—Rena Dye
*Assistant Examiner*—Camie S. Thompson
(74) *Attorney, Agent, or Firm*—Oblon, Spivak, McClelland, Maier & Neustadt, P.C.

(57) ABSTRACT

In a phosphor thin film comprising a matrix material and a luminescence center, the matrix material has the compositional formula: $M^{II}{}_v A_x B_y O_z S_w$, wherein $M^{II}$ is Zn, Cd or Hg, A is Mg, Ca, Sr, Ba or rare earth element, B is Al, Ga or In, and atomic ratios v, x, y, z and w are $0.005 \leq v \leq 5$, $1 \leq x \leq 5$, $1 \leq y \leq 15$, $0 < z \leq 30$, and $0 < w \leq 30$. The phosphor thin film of quality is formed at low cost by a low-temperature process, enabling manufacture of full-color EL panels.

19 Claims, 4 Drawing Sheets

U.S. PATENT DOCUMENTS

| | | |
|---|---|---|
| 6,610,352 B1 * | 8/2003 | Cheong .................... 427/8 |
| 6,614,173 B1 * | 9/2003 | Yano et al. ................ 313/503 |
| 6,627,251 B1 * | 9/2003 | Yano et al. ................ 427/66 |
| 6,650,046 B1 * | 11/2003 | Shirakawa et al. ......... 313/506 |
| 6,699,596 B1 * | 3/2004 | Yano et al. ................ 428/690 |
| 2002/0122895 A1 | 9/2002 | Cheong et al. |

FOREIGN PATENT DOCUMENTS

| | | |
|---|---|---|
| JP | 61-250993 | 11/1986 |
| JP | 62-44989 | 2/1987 |
| JP | 07-122364 | * 5/1995 |
| JP | 8-134440 | 5/1996 |
| JP | 08-134440 | * 5/1996 |
| JP | 09-263756 | * 10/1997 |
| JP | 2840185 | 10/1998 |
| JP | 2001-118677 | 4/2001 |
| WO | WO 02/051960 A1 | 7/2002 |

OTHER PUBLICATIONS

Noboru Mirura, et al., "High-Luminance Blue-Emitting $BaAl_2S_4$: Eu Thin-Film Electroluminescent Device", Jpn. J. Appl. Phys., vol. 38, Part 2, No. 11B, Nov. 15, 1999, pp. L 1291-L 1292.

Shozo Oshio, et al., "Novel Electroluminescent Thin Films: Thiogallate-Type Phosphors", Display and Imaging, vol. 3, No. 2, 1994, (9 pgs.) (with concise explanation).

P. C. Donohue, et al., "The Synthesis and Photoluminescence of $M^{11}M_2^{111}(S_1Se)_4$", J. Electrochem. Soc., vol. 121, No. 1, Jan. 1974, pp. 137-141.

Isao Tanaka, et al., "Composition and Optical Properties of Blue-Emitting $BaAl_2S_4$:$Eu^{24}$ Electroluminescent Thin Films", The 22$^{nd}$ Seminar Data Photoelectric inter-conversion EL Department, May 26, 2000, (8 pgs.) (with concise explanation).

P. Benalloul, et al., "$IIA$-$III_2$-$S_4$ Ternary Compounds: New Host Matrices for Full Color Thin Film Electroluminescence Displays", Appl. Phys. Lett., 63 (14), Oct. 4, 1993, pp. 1954-1956.

K. T. Le Thi, et al., "Investigation of the $MS$-$Al_2S_3$ Systems (M=Ca, Sr, Ba) and Luminescence Properties of Europium-Doped Thioaluminates", Materials Science and Engineering, B14 (1992), pp. 393-397.

Sey-Shing Sun, et al., "High-Performance Alkaline-Earth Thiogallate Blue-Emitting Actfel Devices", Journal of the SID, 4/4, 1996, pp. 305-309.

* cited by examiner

PHOSPHOR THIN FILM, PREPARATION METHOD, AND EL PANEL

BACKGROUND OF THE INVENTION

1. Technical Field

This invention relates to a phosphor thin film for use in electroluminescent (EL) devices, a method of preparing the same and an EL panel using the same.

2. Background Art

In the recent years, active research works have been made on thin-film EL devices as small-size or large-size, lightweight flat display panels. A monochromatic thin-film EL display using a phosphor thin film of manganese-doped zinc sulfide capable of emitting yellowish orange light has already become commercially practical as a double insulation structure using thin-film insulating layers 4A and 4B as shown in FIG. 5. In FIG. 5, a predetermined pattern of lower electrodes 3A is formed on a glass substrate 2, and a dielectric thin film is formed as a lower insulating layer 4A on the lower electrode-bearing substrate 2. On the lower insulating layer 4A, a light-emitting layer 5 in the form of a phosphor thin film and an upper insulating layer 4B are successively formed. On the upper insulating layer 4B, a predetermined pattern of upper electrodes 3B is formed so as to construct a matrix with the lower electrodes 3A. As a general rule, the phosphor thin film is annealed at temperatures below the strain point of the glass substrate 2 in order to enhance luminance.

More recently proposed was a structure using a ceramic substrate as the substrate 2 and a thick-film dielectric layer as the lower insulating layer 4A. Another device structure was proposed in which a high permittivity $BaTiO_3$ thin plate is used as the substrate and an electrode is formed on the back of the substrate so that the thin plate serves as an insulating layer and substrate. Since ceramics such as alumina and $BaTiO_3$ are used as the substrate, these structures permit the phosphor thin film to be annealed at high temperatures for providing an increased luminance. Also, since a thick film or thin plate dielectric layer is used as the insulating layer, these structures are resistant to insulation breakdown as compared with EL devices using a thin film as the insulating layer. Advantageously, more reliable devices can be manufactured. Then a structure of sandwiching a phosphor thin film like the double insulation structure is not necessarily needed. The insulating layer may be a single thick film or thin plate dielectric layer only on one side.

Thin-film EL displays must display images in color in order that they find use as computer, TV and similar monitors. Thin-film EL displays using sulfide phosphor thin films are fully reliable and resistant to environment, but at present regarded unsuitable as color displays because EL phosphors required to emit light in the primary colors of red, green and blue have poor characteristics. Engineers continued research on SrS:Ce (using SrS as a matrix material and Ce as a luminescence center), $SrGa_2S_4$:Ce and ZnS:Tm as a candidate for the blue light-emitting phosphor, ZnS:Sm and CaS:Eu as a candidate for the red light-emitting phosphor, and ZnS:Tb and CaS:Ce as a candidate for the green light-emitting phosphor.

These phosphor thin films capable of emitting light in the primaries of red, green and blue suffer from problems of emission luminance, emission efficiency and color purity. Thus color EL panels have not reached the commercial stage. Referring to the blue color among others, a relatively high luminance is achieved using SrS:Ce. However, as the blue color for full color display, its chromaticity is shifted toward green. There is a desire to have a better blue light-emitting layer.

To solve these problems, thiogallate and thioaluminate base blue phosphors such as $SrGa_2S_4$:Ce, $CaGa_2S_4$:Ce, and $BaAl_2S_4$:Eu were developed as described in JP-A 7-122364, JP-A 8-134440, Shingaku Technical Report, EID 98–113, pp. 19–24, and Jpn. J. Appl. Phys., Vol. 38 (1999), pp. L1291–1292. These thiogallate base phosphors are satisfactory in color purity, but suffer from difficulty to form a thin film of uniform composition because of the multi-component composition. It is believed that thin films of quality are not obtainable because of poor crystallinity resulting from inconvenient composition control, formation of defects resulting from sulfur removal, and admittance of impurities; and these factors lead to a failure to increase the luminance. Also the thiogallate and thioaluminate base phosphors require high processing temperatures for thin film formation, that is, high annealing temperatures of 750 to 900° C. after film deposition. This gives rise to several problems. The substrate material is limited because the substrate must be noticeably heat resistant; diffusion of elements occurs from the substrate or adjacent layer (insulating layer or the like) to the phosphor thin film; interlaminar flatness is compromised; interlaminar separation occurs during high-temperature annealing; pixels are destroyed by surface diffusion during high-temperature annealing; and a thermal guard must be provided on the annealing apparatus for high-temperature annealing, which adds to the expense.

In order to develop practical full color EL panels, phosphor materials capable of establishing blue, green and red phosphors in a consistent manner and at a low cost are necessary. The processing temperature at which phosphor thin films are processed differs with individual materials as mentioned above. This means that in a full color panel requiring three colors RGB to be disposed within it, the conditions under which the respective phosphor thin films are formed for providing the desired emission characteristics differ among them, rendering panel manufacture difficult. In particular, since the thioaluminate and thiogallate base materials require high processing temperatures as mentioned above, it is desired to lower the processing temperature. More particularly, it is desired that red, green and blue phosphor thin-film materials capable of high luminance emission be simultaneously formed and annealed at low temperatures.

SUMMARY OF THE INVENTION

An object of the invention is to provide a phosphor thin film which is improved in quality and cost by lowering the processing temperature which is undesirably high in the prior art thioaluminate and thiogallate base phosphor materials. Another object of the invention is to provide a full color EL panel using the phosphor thin film.

In a first aspect, the invention provides a phosphor thin film comprising a matrix material and a luminescence center. The matrix material has the compositional formula:

$M^{II}_v A_x B_y O_z S_w$ wherein $M^{II}$ is at least one element selected from the group consisting of Zn, Cd and Hg, A is at least one element selected from the group consisting of Mg, Ca, Sr, Ba and rare earth elements, B is at least one element selected from the group consisting of Al, Ga and In, and v, x, y, z and w are representative of atomic ratios, v is from 0.005 to 5, x is from 1 to 5, y is from 1 to 15, z is from more than 0 to 30, and w is from more than 0 to 30.

In preferred embodiments, $M^{II}$ contains at least Zn; the luminescent center is Eu; A is Ba and B is Al; or A is Sr and B is Ga. Preferably, in the compositional formula, v and x are such numbers that v/x is from 0.001 to 1; x and y are such numbers that y/x is from 1 to 4; z and w are such numbers that z/(z+w) is from 0.005 to 0.85, more preferably from 0.005 to 0.3.

In a second aspect, the invention provides an EL panel having the phosphor thin film defined above.

In a third aspect, the invention provides a method for preparing the phosphor thin film defined above, comprising the steps of forming a thin film containing at least $M^{II}$, A, B and S, and annealing the thin film. In a preferred embodiment, the annealing step is conducted in an oxidizing atmosphere and/or at a temperature below 750° C. In a preferred embodiment, the forming step is to form the thin film on a substrate which is set at a temperature of up to 600° C., and more preferably up to 200° C.

The present invention is arrived at as a result of searching for an EL material which can be prepared by a low-temperature process. In the prior art, when a thin film is formed from the thioaluminate or thiogallate base material (the phosphor thin film of the invention contains as the major component in its matrix material), the thin film lacks the consistency of composition because of immature multi-component composition control technology. Additionally, the temperature at which the thin film is formed and at which it is annealed must be high.

In an experimental run the inventors performed, an EL device was fabricated by forming a thin film of $SrGa_2S_4$:Eu which is an excellent green EL material, and annealing it at 700° C. which is lower than in the prior art. However, this EL device failed to produce the desired emission. The emission of this thin film had a luminance of about 380 cd/m² on 1 kHz driving, which was insufficient for the operation of an EL device panel.

Searching for a phosphor material capable of emission at a satisfactory luminance even when annealed at low temperatures of about 700° C., the inventors have found that using a material of a novel composition comprising a thioaluminate or thiogallate base material as a main component and zinc sulfide as an auxiliary component, a phosphor thin film capable of emission at a high luminance can be produced at a relatively low processing temperature. In an example wherein zinc sulfide is added to a strontium thiogallate base material, the resulting material can produce a high luminance even when annealed at a relatively low temperature, insofar as atomic ratios Zn/Sr and Ga/Sr are properly controlled.

When a phosphor thin film of the invention is formed on a substrate by an evaporation process, a highly crystalline thin film is obtained even under the condition that the substrate is set at a relatively low temperature of 600° C. or below, and especially 200° C. or below.

The present invention allows for a lower processing temperature presumably because the crystallization temperature of the phosphor thin film becomes lower. It is not well understood why the crystallization temperature lowers. The literature reporting that barium sulfide and zinc sulfide become eutectic at a relatively low temperature suggests that when an alkaline earth element is used as the element A, for example, a sulfide of Group III element such as Al or Ga and an alkaline earth sulfide react with each other or crystallize together at a relatively low temperature. This probably makes it possible to synthesize a crystal of alkaline earth thioaluminate or thiogallate at a relatively low temperature.

The inventors have also found that by adding a predetermined amount of oxygen to a sulfide in the form of thioaluminate or thiogallate base material having zinc sulfide added thereto, for converting the sulfide to an oxysulfide, the luminance is dramatically enhanced and the luminance life is significantly extended.

DETAILED DESCRIPTION OF PREFERRED EMBODIMENTS

Figure 1:
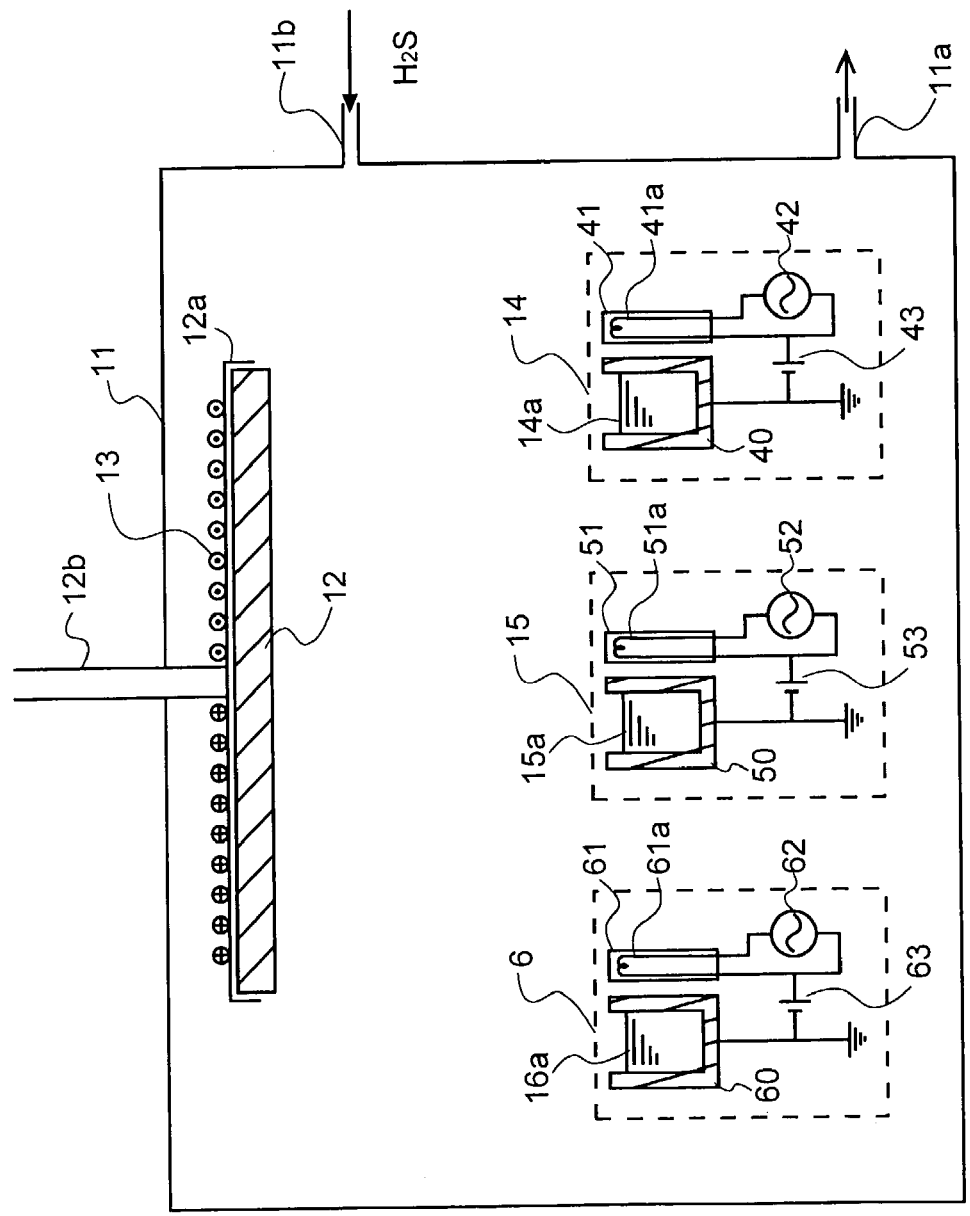
FIG. 1 is a schematic cross-sectional view showing an exemplary construction of the evaporation apparatus used in forming a phosphor thin film of the invention.

Several embodiments of the invention are described in detail.

The phosphor thin film of the invention contains a matrix material and a luminescence center. The matrix material has the compositional formula:

$$M^{II}_v A_x B_y O_z S_w$$

wherein $M^{II}$ is at least one element selected from among Zn, Cd and Hg, A is at least one element selected from among Mg, Ca, Sr, Ba and rare earth elements, B is at least one element selected from among Al, Ga and In, O is oxygen, and S is sulfur.

The letters v, x, y, z and w representative of atomic ratios of respective elements are in the range:
v=0.005 to 5,
x=1 to 5,
y=1 to 15,
z=0 (exclusive) to 30, and
w=0 (exclusive) to 30;

preferably they are in the range:
v=0.005 to 5,
x=1 to 5,
y=1 to 15,
z=1 to 30, and
w=1 to 30.

The matrix material represented by the above compositional formula is a material in which a sulfide in the form of an alkaline earth thioaluminate, alkaline earth thiogallate, alkaline earth thioindate, rare earth thioaluminate, rare earth thiogallate or rare earth thioindate or a mixture of two or more is mixed or combined with a sulfide of element $M^{II}$ selected from the Group 12 elements in the Periodic Table, to form an oxysulfide in which sulfur is, in part, substituted with oxygen. The element $M^{II}$ is effective for lowering the processing temperature. Among the elements $M^{II}$, Zn is the most effective. Therefore, it is preferred to use at least Zn as $M^{II}$. Specifically, it is preferred that the atomic ratio of Zn be at least 10%, and especially 100% of $M^{II}$.

Element A is preferably at least one of alkaline earth elements, and especially at least one of Ba and Sr because they are effective for producing blue and green emissions, respectively. The combination of element A with element B is arbitrary. For producing blue and green emissions, it is preferred to use at least one of Al and Ga as element B. Specifically, what is to be mixed or combined with element $M^{II}$ sulfide is preferably at least one of alkaline earth thioaluminates, alkaline earth thiogallates and alkaline earth thioindates, especially barium thioaluminate containing Ba as element A and Al as element B or strontium thiogallate containing Sr as element A and Ga as element B or both. Since these sulfides have a high crystallization temperature, the present invention is advantageously applicable to them. Especially preferred are barium thioaluminate having Eu added as the luminescent center and strontium thiogallate having Eu added as the luminescent center. These combinations are effective for producing blue and green emissions of a high color purity at a high luminance. It is also preferred that the alkaline earth element in these preferred sulfides be, in part, substituted with a rare earth element.

Described below is a preferred embodiment wherein Zn is used as element $M^{II}$ and an alkaline earth element is predominantly used as element A.

In the above compositional formula, v and x are preferably selected so as to meet:

v/x=0.001 to 1, more preferably 0.01 to 0.5, and even more preferably 0.05 to 0.3. If v/x is too small, that is, if the Zn content is too low, a high luminance cannot be provided unless the annealing temperature of the phosphor thin film is high. If v/x is too large, that is, if the Zn content is too high, a high luminance cannot be provided whether the annealing temperature is high or low. By contrast, a proper range of Zn content ensures a high luminance even when the annealing temperature is relatively low, for example, below 750° C.

In the above compositional formula, x and y are preferably selected so as to meet:

y/x=1 to 4, more preferably 1.5 to 3, even more preferably 1.6 to 1.99, and most preferably 1.70 to 1.90. When Zn is added and y/x falls in this range, the luminance of a phosphor thin film as annealed at a relatively low temperature is further improved.

The composition of the matrix material featuring the co-presence of oxygen and sulfur is effective for improving luminance and life characteristics and preventing the luminance from declining. When a thin film comprising the ternary sulfide (A-B-S) as the matrix material contains oxygen, the addition of oxygen to sulfide promotes crystallization of the matrix material during film deposition or during post treatment such as annealing after film deposition, and permits the luminescent center such as rare earth element to undertake effective transition within the compound crystal field, producing light emission at a high luminance. Also, the matrix material in which a sulfide and an oxide are co-present is stable in air, as compared with pure sulfide. This is because the oxide component protects the light emitting component in the film from the ambient air. The higher the oxygen content, the longer becomes the luminance life. However, too high an oxygen content may lead to a lower luminance. To acquire a high luminance and a long life, the oxygen content in the matrix material should desirably be adjusted to meet:

z/(z+w)≧0.005, preferably ≧0.01, and also desirably to meet:

z/(z+w)≦0.85, preferably ≦0.5.

More desirably, the oxygen content should be adjusted to meet:

z/(z+w)≧0.1, even more preferably ≧0.2 for the extended life, and also to meet:

z/(z+w)≦0.3 for the high luminance.

It is preferred that the phosphor thin film has been crystallized, although an amorphous state having no definite crystalline structure is acceptable.

The crystal present in the phosphor thin film is preferably one or more of $A_5B_2(O,S)_8$, $A_4B_2(O,S)_7$, $A_2B_2(O,S)_5$, $AB_2(O,S)_4$, $AB_4(O,S)_7$, $A_4B_{14}(O,S)_{25}$, $AB_8(O,S)_{13}$ and $AB_{12}(O,S)_{19}$. Zn in the phosphor thin film may be present, at least in part, as ZnS, or be contained in the crystal as a substitute for at least part of element A and/or B. Alternatively, Zn may be present in another crystal (e.g., orthorhombic) containing Zn, A and B. Zn may be present in two or more of these forms.

It is noted that when $Zn_vA_xB_yO_zS_w$ is a compound of a stoichiometric composition, this compound is considered to consist of $v\{Zn(O,S)\}$, $x\{A(O,S)\}$ and $(y/2)\{B_2(O,S)_3\}$. Accordingly, z+w=v+x+3y/2 gives a substantially stoichiometric composition. To produce a high luminance of light emission, the phosphor thin film should preferably have a composition close to the stoichiometry, and specifically, $0.9 \leq (v+x+3y/2)/(z+w) \leq 1.1$ is preferred.

The element contained as the luminescent center is preferably a rare earth element. The rare earth element is selected from among at least Sc, Y, La, Ce, Pr, Nd, Gd, Tb, Ho, Er, Tm, Lu, Sm, Eu, Dy and Yb. Specifically, as the luminescent center to be combined with barium thioaluminate matrix material, Eu is preferred for the blue phosphor, Ce, Tb and Ho are preferred for the green phosphor, and Sm, Yb and Nd are preferred for the red phosphor. Among these, Eu is most preferred because the most intense emission is produced when it is combined with the matrix material. A combination of Eu with strontium thiogallate matrix material results in a green phosphor, and a combination of Eu with strontium thioindate or barium thioindate matrix material results in a red phosphor. An appropriate amount of the element added as the luminescent center is 0.5 to 10 at % based on the element A in the compositional formula.

In addition to the above-described matrix material and luminescent center, the phosphor thin film of the invention may contain trace additives or incidental impurities. Exemplary of such trace additives or incidental impurities are B, C, Si, P, Cl, As, Se, Br, Te, I, Li, Na, Rb, Cs, Ge, Sn, Sb, Ti, Pb, Bi, Sc, Ti, V, Cr, Mn, Fe, Co, Y, Zr, Nb, Mo, Tc, Ru, Rh, Pd, Ag, Hf, Ta, W, Re, Os, Ir, Pt and Au and mixtures thereof. To minimize detrimental impacts on the luminance and other phosphor properties, the total content of these elements in the phosphor thin film should preferably be 0.05 at % or less, especially 0.01 at % or less.

The composition of the phosphor thin film can be ascertained by x-ray fluorescence analysis (XRF), x-ray photoelectron spectroscopy (XPS) or the like.

No particular limits are imposed on the thickness of the phosphor thin film. However, too thick a film requires an increased drive voltage whereas too thin a film results in a low emission efficiency. For this reason, the phosphor thin film preferably has a thickness of about 50 to 700 nm, especially about 100 to 300 nm. A phosphor thin film with a thickness in this range fulfills both a high luminance and a high emission efficiency.

In a preferred embodiment of EL device, the phosphor thin film of the invention is sandwiched between zinc sulfide (ZnS) thin films. Namely, in the EL device, the EL thin film preferably takes a laminate structure of ZnS thin film/phosphor thin film/ZnS thin film. The sandwiching of the phosphor thin film between ZnS thin films is effective for improving the electric charge injection and withstand voltage of the phosphor thin film, so that an EL device is available capable of emission at a high luminance with an applied voltage of up to 200 V, which suggests ease of driving. The thickness of ZnS thin film is preferably about 30 to 400 nm, more preferably about 100 to 300 nm. When ZnS thin films are provided, the structure is not limited to the three layer structure described above, and may be a structure of alternately deposited ZnS and phosphor thin films with the outermost layer being a ZnS thin film like a structure of ZnS thin film/phosphor thin film/ZnS thin film/phosphor thin film/ZnS thin film. Alternatively, provided that a laminate of three layers: ZnS thin film/phosphor thin film/ZnS thin film is a unit, a structure in which a plurality of such units are stacked is also acceptable. Also, a structure having a thin film of oxide (e.g., $Al_2O_3$) or nitride on either side of a ZnS thin film/phosphor thin film/ZnS thin film structure is preferred. When the phosphor thin film is as thin as about 50 nm, the ZnS thin film combined therewith functions as an electron injecting layer for the phosphor thin film mainly for assisting in emission at a high luminance. When the phosphor thin film is annealed in an oxidizing atmosphere as will be described later, the thin film of $Al_2O_3$ or the like also functions as a cap layer for controlling the amount of oxygen introduced into the phosphor thin film from the atmosphere. The thin film of $Al_2O_3$ or the like preferably has a thickness of about 5 to 150 nm, more preferably about 10 to 100 nm.

The phosphor thin film of the invention is preferably prepared, for example, by the following evaporation process. Reference is now made to a $Zn_vSr_xGa_yO_zS_w$:Eu phosphor thin film as a typical example.

In the evaporation process, a strontium sulfide pellet having europium added, a gallium sulfide pellet and a zinc sulfide pellet are prepared. In a vacuum chamber into which $H_2S$ gas is admitted, these three pellets are evaporated (i.e., ternary evaporation process). The $H_2S$ gas is used so that sulfur may react with the evaporated reactants.

Europium (Eu) added as the luminescent center to the evaporation source is in a metal, fluoride, oxide or sulfide form. Since the content of the luminescent center in the evaporation source is different from the content of the luminescent center in the thin film which is formed using that evaporation source, the content of the luminescent center in the evaporation source is adjusted so as to provide the desired content in the resulting thin film.

In the evaporation process, the temperature of the substrate is preferably from room temperature to 600° C., more preferably from 100° C. to 200° C. If the substrate temperature is too high, the thin film deposited thereon may have more asperities on its surface and contain pin holes therein, giving rise to the problem of current leakage on EL devices. Also the thin film can be colored brown. Too low a substrate temperature can compromise the crystallinity of the thin film.

After the film deposition, the thin film is preferably annealed in order to improve the crystallinity and adjust the composition thereof. The atmosphere during the annealing is selected from reducing atmospheres of vacuum, $N_2$ and Ar, oxidizing atmospheres of air and the like, sulfur vapor, $H_2S$ and the like, depending on a particular purpose. Annealing in an oxidizing atmosphere is advantageous in that oxygen is incorporated into the thin film to form a matrix material of the desired composition. The oxidizing atmosphere is preferably air or an atmosphere having a higher oxygen concentration than air. The annealing temperature is generally in the range of about 500 to 1000° C., and preferably about 600 to 800° C. In the present invention, a fully high luminance is available even when the annealing temperature is lower than 750° C., and especially 700° C. or lower. At too low an annealing temperature, the effect of improving crystallinity or luminance becomes insufficient. The annealing time is generally about 1 to 60 minutes, and preferably about 5 to 30 minutes. Too short an annealing time fails to achieve the desired effect. Increasing the annealing time beyond the range does not bring about a significant enhancement of the annealing effect. Such long term heating can undesirably damage the components other than the phosphor thin film of the EL device (e.g., electrode, substrate).

Besides the annealing step, oxygen can be introduced into the phosphor thin film by taking a suitable means during film deposition. For example, an oxide is used as at least one evaporation source, or a thin film is formed by reactive evaporation using oxygen gas as the reactive gas. It is also acceptable to employ two or more of these oxygen introducing means.

The phosphor thin film thus formed is preferably a highly crystalline thin film. Crystallinity can be evaluated by x-ray diffraction, for example.

The pressure during evaporation to deposit the phosphor thin film is preferably $1.33\times10^{-4}$ to $1.33\times10^{-1}$ Pa. More preferably, the amount of $H_2S$ gas fed for compensating for sulfur may be adjusted to maintain a pressure of $6.65\times10^{-3}$ to $6.65\times10^{-2}$ Pa. If the pressure exceeds the range, the operation of the electron gun becomes unstable, and composition control becomes very difficult. The feed rate of $H_2S$ gas is preferably 5 to 200 standard cubic centimeters per minute (SCCM), especially 10 to 30 SCCM although it varies depending on the power of the vacuum system.

If desired, the substrate may be moved or rotated during evaporation. By moving or rotating the substrate, the deposited film becomes uniform in composition and minimized in the variation of thickness distribution.

When the substrate is rotated, the rotational speed is preferably at least about 10 rpm, more preferably about 10 to 50 rpm, and especially about 10 to 30 rpm. If the rotational speed of the substrate is too high, it becomes difficult to provide a seal to maintain the vacuum chamber gas-tight during the process. If the rotational speed of the substrate is too low, compositional gradation may occur in the thickness direction within the chamber so that the resulting phosphor thin film may have poor characteristics as the light emitting layer. The means for rotating the substrate may be any well-known rotating mechanism including a power transmission/gear mechanism having a power source such as a motor or hydraulic rotational mechanism combined with gears, belts, pulleys and the like.

The means for heating the evaporation sources and the substrate may be selected, for example, from tantalum wire heaters, sheath heaters and carbon heaters, as long as they have the predetermined thermal capacity, reactivity or the like. The temperature reached by the heating means is preferably in the range of about 100 to about 1,400° C., and the precision of temperature control is about ±1° C., preferably about ±0.5° C. at 1,000° C.

FIG. 1 illustrates one exemplary construction of the apparatus for forming the phosphor thin film of the invention. Reference is made to an embodiment wherein a thin film is deposited by evaporating sources of strontium sulfide having Eu added as the luminescent center, gallium sulfide and zinc sulfide while feeding $H_2S$. In the illustrated embodiment, a substrate 12 and electron beam (EB) evaporation sources 14, 15 and 16 are disposed within a vacuum chamber 11.

The EB evaporation sources 14, 15 and 16 include crucibles 40, 50 and 60 which contain strontium sulfide 14a having the luminescent center added, zinc sulfide 15a and gallium sulfide 16a, respectively, and electron guns 41, 51 and 61 having electron emitting filaments 41a, 51a and 61a built therein, respectively. Built in the electron guns 41, 51, 61 are mechanisms for controlling electron beams. To the electron guns 41, 51, 61 are connected ac power supplies 42, 52, 62 and bias power supplies 43, 53, 63.

The electron guns 41, 51, 61 produce electron beams at predetermined powers in a controlled manner, which are irradiated to the crucibles 40, 50, 60 for evaporating the strontium sulfide 14a, zinc sulfide 15a and gallium sulfide 16a at predetermined rates. Although three E guns are used to control the evaporation sources in the illustrated embodiment, multi-source simultaneous evaporation can be performed using a single E gun, which is known as multi-source pulse evaporation process.

In the illustrated embodiment, the evaporation sources 14, 15, 16 are depicted, for the convenience of illustration, at positions corresponding to local areas of the substrate. Actually, the evaporation sources are located such that the deposited film may become uniform in composition and thickness. Although the embodiment illustrated in FIG. 1 uses three EB evaporation sources, the evaporation sources are not limited to EB evaporation. Depending on the material to be deposited and the evaporation conditions, other evaporation sources such as by resistive heating may be used.

The vacuum chamber 11 has an exhaust port 11a through which the chamber is evacuated to establish a predetermined vacuum in the chamber. The vacuum chamber 11 also has an inlet port 11b through which a reactant gas such as hydrogen sulfide is admitted into the chamber.

The substrate 12 is fixedly secured to a holder 12a. The holder 12a has a shaft 12b which is rotatably held by an outside rotating shaft mount (not shown) so that the vacuum may be maintained in the chamber 11. The shaft 12b is adapted to be rotated at a predetermined number of revolutions by a rotating means (not shown). A heating means 13 in the form of a heater wire or the like is closely secured to the substrate holder 12a so that the substrate may be heated and maintained at the desired temperature.

Using the illustrated apparatus, the vapors of strontium sulfide, zinc sulfide and gallium sulfide are evaporated from the EB evaporation sources 14, 15, 16 and deposited and bound on the substrate 12 to form a phosphor thin film of Eu-doped strontium zinc gallium sulfide. By rotating the substrate 12 during the evaporation process if desired, the phosphor thin film being deposited can be made more uniform in composition and thickness distribution.

Using the phosphor thin film of the invention, an EL device is manufactured. Illustratively, the phosphor thin film of the invention or a laminate of the phosphor thin film, ZnS thin films and $Al_2O_3$ thin films as mentioned previously is used as a light emitting layer 5 in the double insulation structure shown in FIG. 5 or as a light emitting layer in a structure in which an insulating layer in the form of a thick film or thin plate dielectric layer is provided only on one side.

Between two adjacent ones of the insulating layers, light emitting layer and electrodes in the EL device, an intermediate layer such as a bond enhancing layer, stress relief layer or reaction controlling layer may be disposed. The thick film may be improved in smoothness as by polishing its surface or using a smoothing layer.

Figure 5:
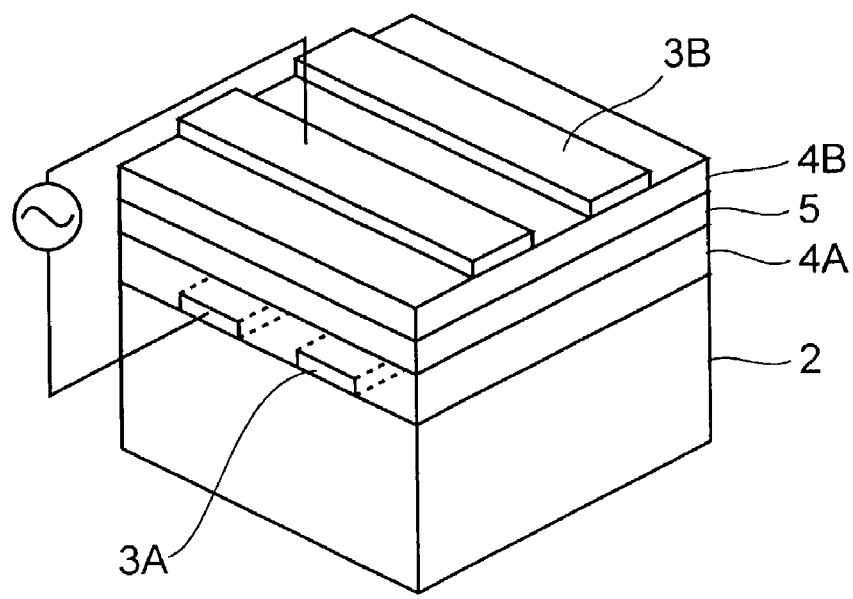
FIG. 5 is a perspective view of a portion cut out of an EL device of double insulation structure.

For example, a dielectric layer formed by a solution coating/firing method may be formed on the lower insulating layer 4A in FIG. 5 for the smoothing purpose. It is noted that the solution coating/firing method involves coating a solution of dielectric material precursor to a substrate and firing the coating to form a dielectric layer and is exemplified by the sol-gel method and the metallo-organic decomposition (MOD) method.

If it is necessary to restrain diffusion of elements from a thick-film insulating layer to the phosphor thin film, a barrier layer of $BaTiO_3$ or the like is preferably formed between the thick-film insulating layer and the phosphor thin film.

Any desired material may used as the substrate as long as the substrate has a heat resistant temperature or melting point of at least 600° C., preferably at least 700° C., especially at least 800° C. so that the substrate may withstand the forming temperature of the EL device layers and the annealing temperature of the EL device, the substrate allows deposition thereon of functional thin films such as a light emitting layer by which the EL device can be constructed, and the substrate maintains the predetermined strength. Illustrative examples include glass substrates, ceramic substrates of alumina ($Al_2O_3$), forsterite (2MgO.$SiO_2$), steatite (MgO.$SiO_2$), mullite ($3Al_2O_3.2SiO_2$), beryllia (BeO), aluminum nitride (AlN), silicon nitride ($Si_3N_4$), and silicon carbide (SiC+BeO) as well as heat resistant glass substrates of crystallized glass or the like. Of these, alumina substrates and crystallized glass substrates are especially preferable because the heat resistant temperature is higher than about 1000° C. Where heat transfer is necessary, beryllia, aluminum nitride, silicon carbide and the like are preferred. Also useful are quartz, heat oxidized silicon wafers, etc. as well as metal substrates such as titanium, stainless steel, Inconel and iron base materials. Where electro-conductive substrates such as metal substrates are used, a structure in which a thick film having an internal electrode is formed on a substrate is preferred. It is noted that since the phosphor thin film of the invention permits low-temperature annealing, the substrate used may have a relatively low heat resistant temperature or melting point in harmony with the annealing temperature.

Any well-known dielectric thick-film material may be used as the material of the dielectric thick-film (lower insulating layer). Materials having a relatively high permittivity are preferred. For example, lead titanate, lead niobate and barium titanate based materials are preferred. The dielectric thick film has a resistivity of at least $10^8$ Ω·cm, especially about $10^{10}$ to $10^{18}$ Ω·cm. A material having a relatively high permittivity as well is preferred. The permittivity $\epsilon$ is preferably about 100 to 10,000. The preferred thickness is 5 to 50 μm, especially 10 to 30 μm.

The dielectric thick film is formed by any desired method as long as a film having a predetermined thickness can be formed in a relatively simple manner. The sol-gel method and printing/firing method are especially preferred. Where the printing/firing method is employed, a material is fractionated to an appropriate particle size and mixed with a binder to form a paste having an appropriate viscosity. The paste is applied onto a substrate by a screen printing technique, and dried. The green sheet is fired at an appropriate temperature, yielding a thick film.

Examples of the material of which the thin-film insulating layer (upper insulating layer) is made include silicon oxide ($SiO_2$), silicon nitride ($Si_3N_4$), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate, PMN-PT base materials, and multilayer or mixed thin films of any. In forming the insulating layer from these materials, any of conventional methods such as evaporation, sputtering, and CVD methods may be used. The insulating layer preferably has a thickness of about 50 to 1,000 nm, especially about 100 to 500 nm.

The lower electrode is generally formed within the lower insulating layer. The lower electrode is exposed to high temperature during heat treatment of a light emitting layer and also during formation of the lower insulating layer if the lower insulating layer is constructed by a thick film. Therefore, the lower electrode should preferably have heat resistance and illustratively be a metal electrode. The metal electrode may be a customary metal electrode containing as a main component one or more elements selected from palladium, rhodium, iridium, rhenium, ruthenium, platinum, silver, tantalum, nickel, chromium and titanium.

On the other hand, the upper electrode is preferably a electrode which is transmissive to light in the predetermined emission wavelength region because the emitted light often exits from the opposite side to the substrate. Transparent electrodes of ZnO, ITO, IZO and the like are especially preferred. ITO generally contains $In_2O_3$ and $SnO_2$ in stoichiometry although the oxygen content may deviate somewhat therefrom. An appropriate proportion of $SnO_2$ mixed with $In_2O_3$ is about 1 to 20%, more preferably about 5 to 12% by weight. For IZO, an appropriate proportion of ZnO mixed with $In_2O_3$ is generally about 12 to 32% by weight. It is noted that when a transparent substrate is used so that the emitted light exits from the substrate side, the lower electrode is a transparent electrode.

Also the electrode may be a silicon-based one. The silicon electrode may be either polycrystalline silicon (p-Si) or amorphous silicon (a-Si), or even single crystal silicon if desired. The silicon electrode is doped with an impurity for imparting electric conductivity. Any dopant may be used as the impurity as long as it can impart the desired conductivity. Use may be made of dopants commonly used in the silicon semiconductor art. Illustratively, preferred dopants are B, P, As, Sb and Al. The preferred dopant concentration is about 0.001 to 5 at %.

In forming the electrode, any of conventional methods such as evaporation, sputtering, CVD, sol-gel and printing/firing methods may be used. In forming a structure including a dielectric thick film having an internal electrode built therein, the electrode is preferably formed by the same method as used in forming the dielectric thick film.

The electrode should preferably have a resistivity of up to 1 Ω·cm, especially about 0.003 to 0.1 Ω·cm in order to apply an effective electric field across the light emitting layer. The preferred thickness of the electrode is about 50 to 2,000 nm, especially about 100 to 1,000 nm although it depends on the electrode material.

The phosphor thin film of the invention is applicable to a variety of EL panels, for example, full-color panels for display, multicolor panels and partially color panels partially displaying three colors.

EXAMPLE

Examples are given below for illustrating the invention in more detail.

Example 1

Figure 4:
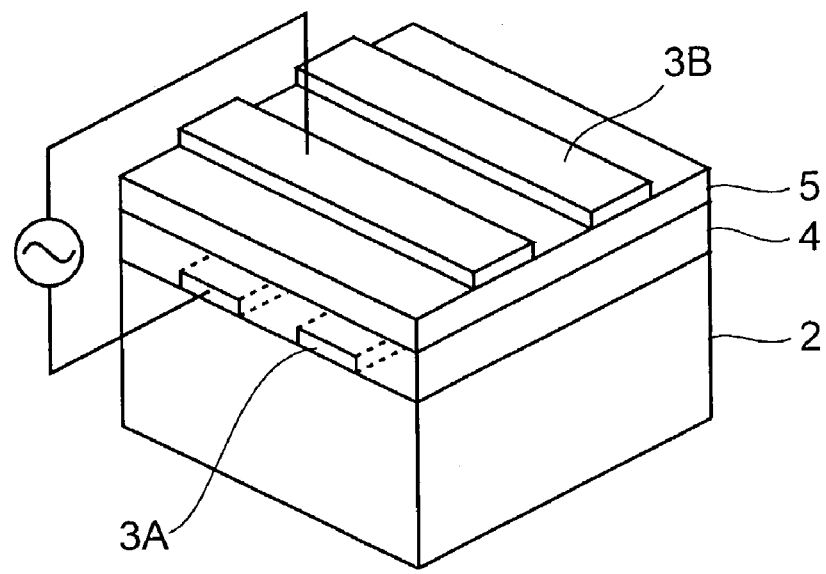
FIG. 4 is a perspective view of a portion cut out of an EL device.

An EL device (or panel) was fabricated using a phosphor thin film according to the invention. The EL device basically has the structure shown in FIG. 4.

For the substrate 2 and insulating layer 4, $BaTiO_3$—$PbTiO_3$ base dielectric material having a permittivity of 5,000 was commonly used. For the lower electrode 3A, Pd was used. On fabrication, a sheet of the substrate 2 was formed, and pastes for the lower electrode 3A and insulating layer 4 were screen printed thereon to form green sheets, which were co-fired. The surface of the insulating layer 4 was polished to a thickness of 30 μm. On the insulating layer 4, a $BaTiO_3$ coating was formed by sputtering as a barrier layer to a thickness of 400 nm. This was annealed in air at 700° C.

On the barrier layer, a thin film laminate having the structure of $Al_2O_3$ film (50 nm)/ZnS thin film (200 nm)/phosphor thin film (200 nm)/ZnS thin film (200 nm)/$Al_2O_3$ film (50 nm) was formed as the light emitting layer 5. It is noted that the numerical value in parentheses designates a thickness and the respective thin films are formed by the evaporation process.

The phosphor thin film was prepared by a ternary evaporation process. An EB evaporation source containing a SrS pellet having 5 mol % Eu added, an EB evaporation source containing a ZnS pellet and an EB evaporation source containing a $Ga_2S_3$ pellet were placed in a vacuum chamber into which $H_2S$ gas was admitted. The reactants were simultaneously evaporated from the respective sources and deposited on a rotating substrate heated at 150° C., forming a thin film of $Zn_vSr_xGa_yO_zS_w$:Eu. The evaporation rates of the sources were adjusted such that the film was deposited on the substrate at a deposition rate of 1 nm/s. The $H_2S$ gas was fed at 20 SCCM.

After the uppermost layer, $Al_2O_3$ thin film was formed, the structure was annealed in air at 700° C. for 10 minutes.

For composition analysis, the same thin film laminate was similarly formed on a Si substrate and annealed. The forming and annealing conditions of the thin film laminate were the same as used for the thin film laminate in the EL device. The phosphor thin film in the thin film laminate was analyzed for composition by fluorescent x-ray analysis, finding an atomic ratio (arbitrary unit) as shown below.

| | |
|---|---|
| Zn: | 1.36 |
| Sr: | 8.82 |
| Ga: | 16.42 |
| O: | 7.01 |
| S: | 26.44 |
| Eu: | 0.45 |

This indicates that the atomic ratios in $Zn_vSr_xGa_yO_zS_w$:Eu are:

v/x=0.15, y/x=1.86, z/(z+w)=0.21, and (v+x+3y/2)/(z+w)=1.04.

The Eu content is 5.1 at % based on Sr. It was previously ascertained that the phosphor thin film for composition analysis had an identical composition with the phosphor thin film in the EL device.

By RF magnetron sputtering technique using an ITO target, a transparent ITO electrode (upper electrode 3B) of 200 nm thick was formed on the uppermost layer, $Al_2O_3$ thin film at a substrate temperature of 250° C. to complete an EL device.

Figure 2:
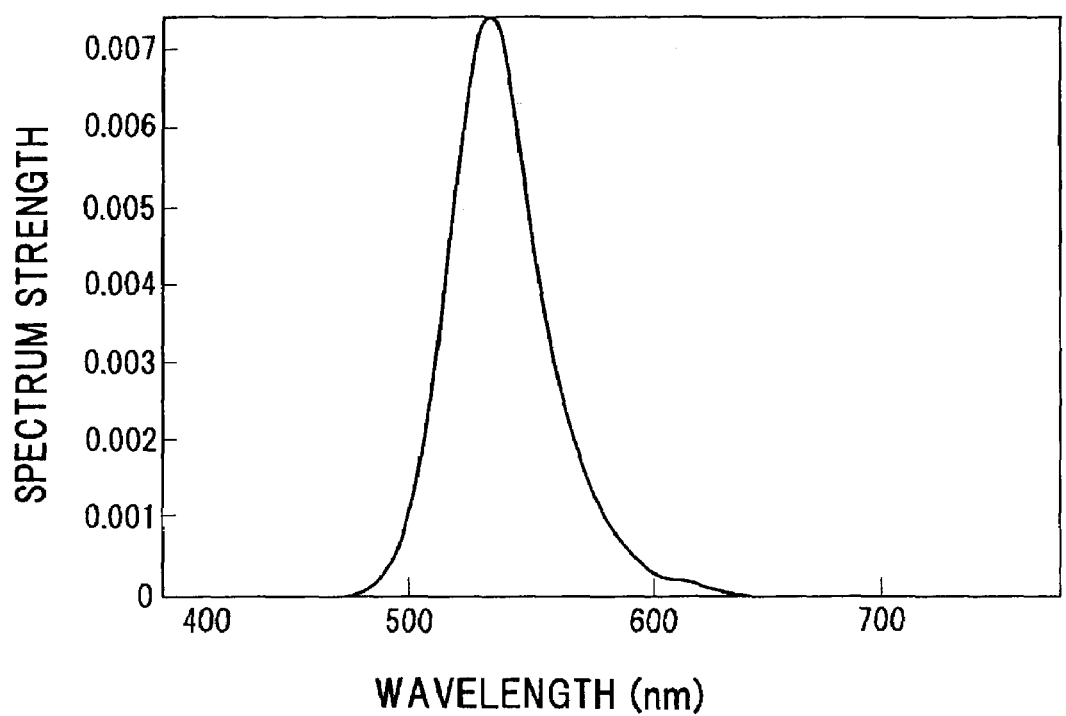
FIG. 2 is a graph showing the emission spectrum of the EL device or panel of Example 1.

The emission performance of the EL device was examined by connecting leads to the upper and lower electrodes and applying an ambipolar electric field having a frequency of 1 kHz and a pulse width of 50 µs. Green light emission having a luminance of 2,170 cd/m² and (0.2218, 0.6954) in CIE 1931 chromaticity diagram, matching with the NTSC level, was produced in a reproducible manner. FIG. 2 shows a light emission spectrum of this EL device.

Figure 3:
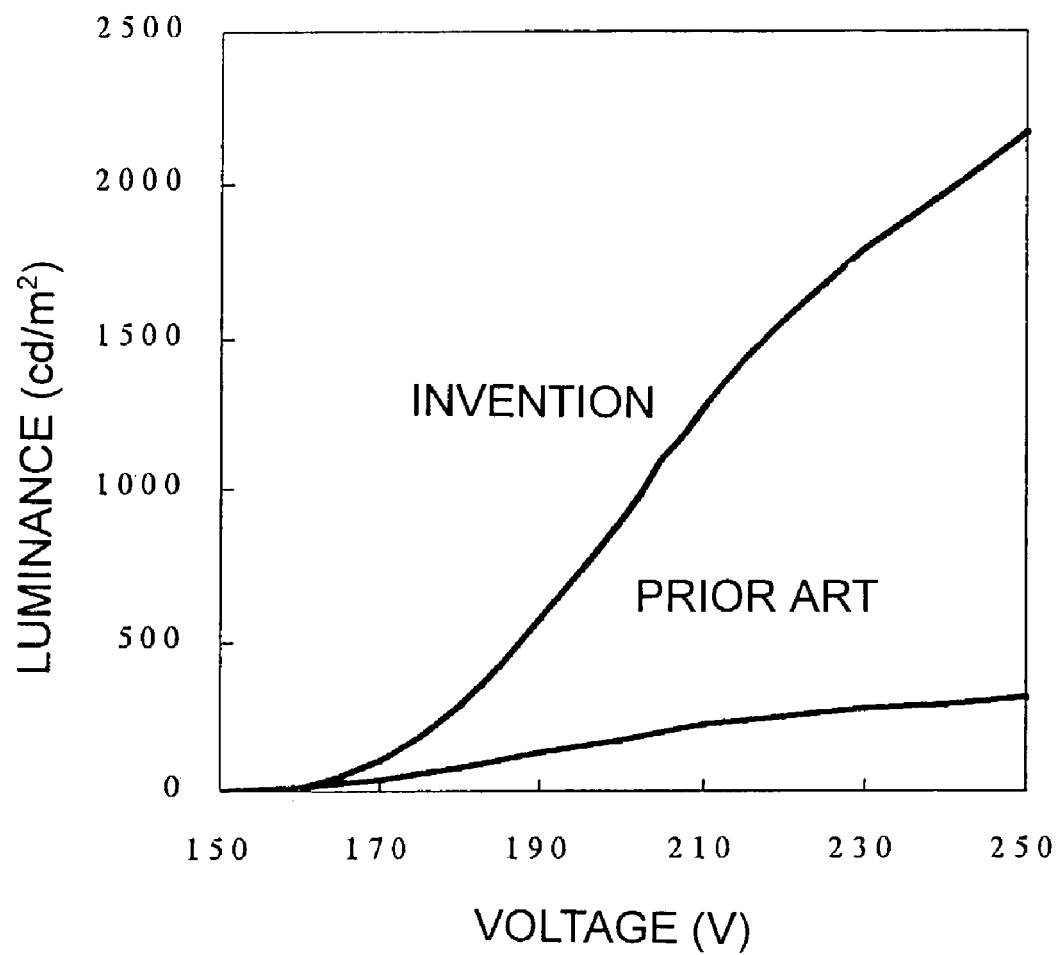
FIG. 3 is a graph showing the luminance versus voltage of the EL devices or panels of Example 1 and Comparative Example.

For comparison purposes, an EL device was similarly fabricated except that a phosphor thin film of Zn-free $SrGa_2(S, O)_4$ was formed instead of the above phosphor thin film. This phosphor thin film was also annealed in air at 700° C. for 10 minutes. For the comparative device and the inventive device, the relationship of luminance (L) to applied voltage (V) was examined. FIG. 3 shows the L–V characteristics of these devices. It is evident from FIG. 3 that when a phosphor thin film is formed on a substrate at a low temperature of 150° C. and annealed at a relatively low temperature of 700° C., the inventive device produces green light emission at a remarkably higher luminance than in the prior art.

Also, EL devices were similarly fabricated except that the annealing conditions were controlled so that the phosphor thin film might have a z/(z+w) value of 0.003 or 0.110. By continuously applying AC voltage at 1 kHz, these devices were examined for luminance loss. After 40 hours of operation, the device wherein z/(z+w)=0.110 provided an emission luminance dropped to 70% of the initial luminance and the device wherein z/(z+w)=0.003 provided an emission luminance dropped to 20% of the initial luminance. It was confirmed that the luminance life can be significantly improved by controlling the oxygen content of the phosphor thin film.

Example 2

An EL device was fabricated as in Example 1 except that a BaS pellet was used instead of the SrS pellet, a $Al_2S_3$ pellet was used instead of the $Ga_2S_3$ pellet, and a phosphor thin film of $Zn_vBa_xAl_yO_zS_w$:Eu having a thickness of 300 nm was formed. The phosphor thin film was analyzed for composition by fluorescent x-ray analysis, finding an atomic ratio (arbitrary unit) as shown below.

|     |       |
| --- | ----- |
| Zn: | 1.40  |
| Ba: | 8.86  |
| Al: | 16.45 |
| O:  | 6.88  |
| S:  | 26.50 |
| Eu: | 0.44  |

This indicates that the atomic ratios in $Zn_vBa_xAl_yO_zS_w$:Eu are:

v/x=0.16,
y/x=1.86,
z/(z+w)=0.21, and
(v+x+3y/2)/(z+w)=1.05.

The Eu content is 5 at % based on Ba.

The emission performance of the EL device was examined as in Example 1. Blue light emission having a luminance of 700 cd/m² was produced in a reproducible manner. For comparison purposes, an EL device was similarly fabricated except that a phosphor thin film of Zn-free $BaAl_2(S, O)_4$ was formed instead of the above phosphor thin film. This phosphor thin film was also annealed in air at 700° C. for 10 minutes. The light emission of the comparative device was not blue, but dark orange and had a luminance of several cd/m². It is thus evident that when a phosphor thin film is formed on a substrate at a low temperature of 150° C. and annealed at a relatively low temperature of 700° C., the inventive device produces blue light emission at a remarkably higher luminance than in the prior art.

Also, an EL device was similarly fabricated except that the annealing conditions were controlled so that the phosphor thin film might have a z/(z+w) value of 0.003. By continuously applying AC voltage at 1 kHz, the comparative EL device and the inventive EL device wherein z/(z+w)=0.21 were examined for luminance loss. After 40 hours of operation, the device wherein z/(z+w)=0.21 provided an emission luminance dropped to 60% of the initial luminance and the device wherein z/(z+w)=0.003 provided an emission luminance dropped to 30% of the initial luminance. It was confirmed that the luminance life can be significantly improved by controlling the oxygen content of the phosphor thin film.

Example 3

EL devices were fabricated as in Example 1 except that the values of v/x and y/x in the phosphor thin film of $Zn_vSr_xGa_yO_zS_w$:Eu were changed as shown in Table 1. The luminance of these EL devices was measured as in Example 1, with the results shown in Table 1.

TABLE 1

| Device No. | v/x  | y/x  | Luminance (cd/m²) |
| ---------- | ---- | ---- | ----------------- |
| 1          | 1.27 | 2.52 | 631               |
| 2          | 0.05 | 1.78 | 1742              |
| 3          | 0.35 | 2.48 | 655               |
| 4          | 0.27 | 1.73 | 1711              |
| 5          | 0.15 | 1.86 | 2170              |

The advantages of the invention are evident from Table 1. The luminance of the phosphor thin film is improved by introducing Zn therein. A very high luminance is achieved when v/x is from 0.001 to 1 and y/x is from 1.6 to 1.99.

In an additional run, phosphor thin films were formed using Ba as element A, In as element B and Eu as the luminescent center, and annealed at a relatively low temperature of 700° C. It was confirmed that the addition of Zn to the phosphor thin film achieved an improvement in the luminance of red light emission.

Benefits of the Invention

The phosphor thin films of the invention produce blue, green and red light emissions of satisfactory color purity at a high luminance. The use of these phosphor thin films eliminates a need for filters in EL panels. Such improved emission characteristics are achieved by a low temperature process. Therefore, the invention makes great contributions to the performance improvement and cost reduction of multi-color EL devices and full-color EL devices.

Japanese Patent Application Nos. 2002-030133 and 2002-381967 are incorporated herein by reference.

What is claimed is:

1. A phosphor thin film comprising a matrix material and a luminescence center, said matrix material having the compositional formula:

$$M^{II}_v A_x B_y O_z S_w$$

wherein
  $M^{II}$ is at least one element selected from the group consisting of Zn, Cd and Hg,
  A is at least one element selected from the group consisting of Mg, Ca, Sr, Ba and rare earth elements,
  B is at least one element selected from the group consisting of Al, Ga and In, and
  v, x, y, z and w are representative of atomic ratios, v is from 0.005 to 5, x is from 1 to 5, y is from 1 to 15, z is more than 0 and not more than 30, and w is more than 0 and not more than 30,
  wherein in the compositional formula, v and x are such numbers that v/x is from 0.001 to 1.

2. The phosphor thin film of claim 1 wherein in the compositional formula, x and y are such numbers that v/x is from 1 to 4.

3. The phosphor thin film of claim 1 wherein $M^{II}$ contains at least Zn.

4. The phosphor thin film of claim 1 wherein said luminescent center is Eu.

5. The phosphor thin film of claim 1 wherein A is Ba and B is Al.

6. The phosphor thin film of claim 1 wherein A is Sr and B is Ga.

7. The phosphor thin film of claim 1 wherein in the compositional formula, z and w are such numbers that z/(z+w) is from 0.005 to 0.85.

8. The phosphor thin film of claim 1 wherein in the compositional formula, z and w are such numbers that z/(z+w) is from 0.005 to 0.3.

9. An EL panel having the phosphor thin film of claim 1.

10. A method for preparing the phosphor thin film of claim 1, comprising the steps of:
  forming a thin film containing at least $M^{II}$, A, B and S, and annealing the thin film.

11. The method of claim 10 wherein the annealing step is conducted in an oxidizing atmosphere.

12. The method of claim 10 wherein the annealing step is conducted at a temperature below 750° C.

13. The method of claim 10 wherein the forming step is to form the thin film on a substrate which is set at a temperature of up to 600° C.

14. The method of claim 10 wherein the forming step is to form the thin film on a substrate which is set at a temperature of up to 200° C.

15. The EL panel of claim 9 wherein the phosphor thin film is present in a ZnS thin film/phosphor thin film/ZnS structure.

16. The EL panel of claim 15 wherein the structure is one of alternately deposited ZnS and phosphor thin films with the outermost layer being a ZnS thin film.

17. The EL panel of claim 15 wherein the structure is a multilayer structure of ZnS thin film/phosphor thin film/ZnS thin film/(repeated)/phosphor thin film/ZnS thin film.

18. The EL panel of claim 15 wherein a thin film of an oxide or nitride is present on either side of the ZnS thin film/phosphor thin film/ZnS structure.

19. The phosphor thin film of claim 3 wherein Zn is present in the phosphor thin film in at least one of the following forms: at least in part as ZnS; in a crystal as a substitute for at least part of A and/or B; and in another crystal containing Zn, A and B.

* * * * *